Sept. 14, 1937.    W. T. HOOFNAGLE ET AL    2,093,148
BEACH CLEANING MACHINE
Filed June 10, 1936    3 Sheets-Sheet 1

INVENTORS
George Malvese and William T. Hoofnagle.
BY
ATTORNEY

INVENTORS
George Malvese and William T. Hoofnagle.

Sept. 14, 1937.  W. T. HOOFNAGLE ET AL  2,093,148
BEACH CLEANING MACHINE
Filed June 10, 1936  3 Sheets-Sheet 3

INVENTORS
George Malvese and William T. Hoofnagle.
BY
ATTORNEY

Patented Sept. 14, 1937

2,093,148

UNITED STATES PATENT OFFICE 2,093,148

BEACH CLEANING MACHINE

William T. Hoofnagle, Glen Ridge, N. J., and George Malvese, New Hyde Park, N. Y.

Application June 10, 1936, Serial No. 84,404

13 Claims. (Cl. 55—17)

This invention relates to apparatus for clearing litter from beaches, playground areas and the like, where the surface to be cleared has slight irregularities and comprises largely a soft surface such as sand.

The practice in clearing beaches where large numbers of people congregate has largely been a manual process, where a large crew of men with rakes and hand tools clear up the litter such as papers, bottles, food remnants and the like, to make the beach surface clean and presentable for future use. This process has been a rather expensive one, particularly where large beach areas are concerned.

It is an object of this invention to provide a machine which is capable of picking up the miscellaneous litter which accumulates on a beach, and delivering it to wagons which are towed behind the machine. Certain technical difficulties present themselves in the construction of such a machine, since the litter to be cleaned up is so heterogeneous as to require special provisions for properly taking care of it.

In the form of the invention which we have evolved, the machine comprises a more or less standard form of track laying tractor or vehicle upon which is mounted a conveyor belt having a plurality of sets of rakes extending around the belt, one part of this belt being swingable to engage the beach surface with varying degrees of pressure, so that the rakes, as they progress around the conveyor belt, will effectively pick up bottles, paper of various sizes and other matter which is likely to be dropped upon the beach by pleasure seekers. The rakes carried by the conveyor belt must be of a width sufficient to clear a fairly wide swathe along the beach—we have found that a width of approximately eight feet is satisfactory in this respect. The operator of the cleaning machine must necessarily be forwardly located thereon, ahead of the conveyor apparatus, so we have devised the conveyor superstructure in such a manner as to permit the operator to steer and control the vehicle while being located at the extreme forward end thereof. The tractor is adapted to tow a wagon which receives the litter discharged by the conveyor belt, and a suitable stripping device is provided at the rear end of the machine, over the wagon, by which material impaled upon the tines of the rakes is stripped from the conveyor belt and discharged into the wagon.

Further objects of the invention are to provide a proper form of rake organization which will effectively gather up beach litter; to provide a stripping mechanism to remove matter from the rakes which will not be apt to clog up and cause faulty operation of the machine; to provide a forwardly located control position for an operator by which he may regulate the action of the machine; to provide means by which sand may be sifted from the litter which is gathered, by which the amount of sand delivered to the wagon rearwardly of the machine is minimized; to provide means by which that part of the conveyor belt which addresses the beach surface may be adjusted as to height with respect to the beach surface; to provide a pilot truck forward of the apparatus upon which part of the weight of the apparatus is supported.

Further objects of the invention will become apparent as the description proceeds in connection with the annexed drawings, in which.

Figure 1:
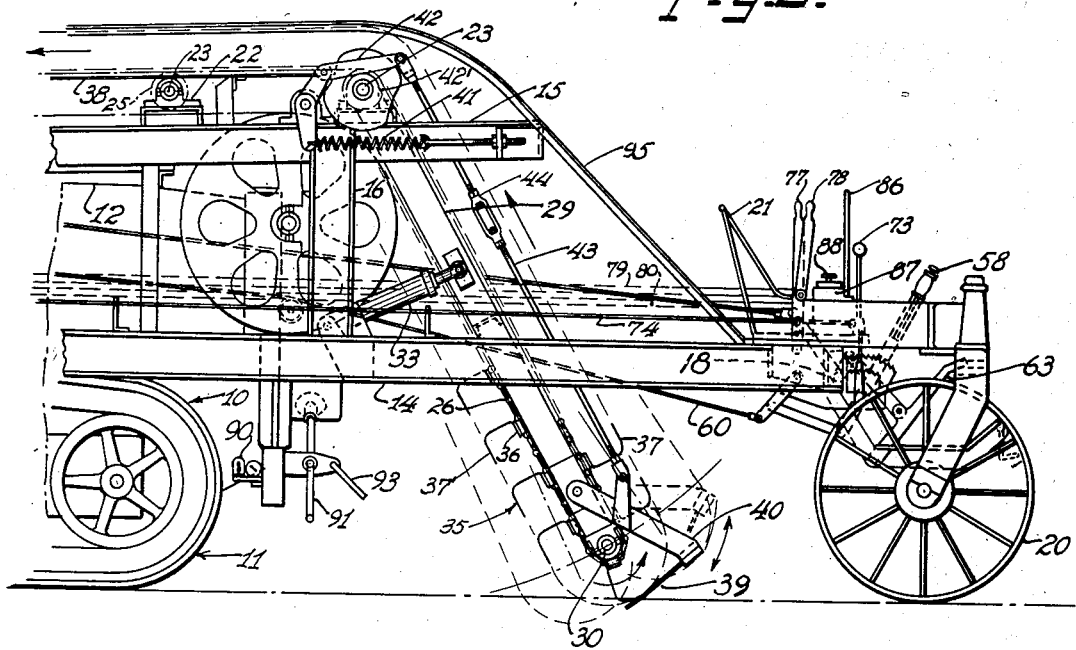
Fig. 1 is a side elevation of the forward part of the machine.
Figure 3:
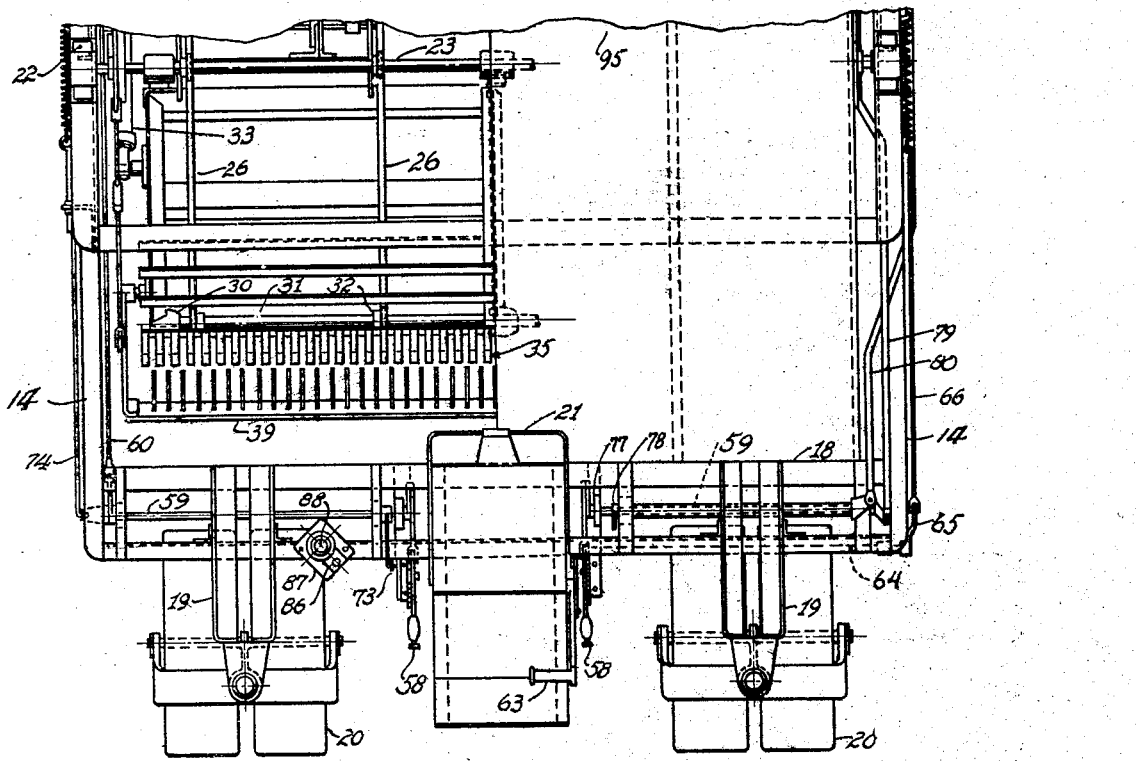
Fig. 3 is a plan, partly broken away, of the forward part of the machine.
Figure 5:
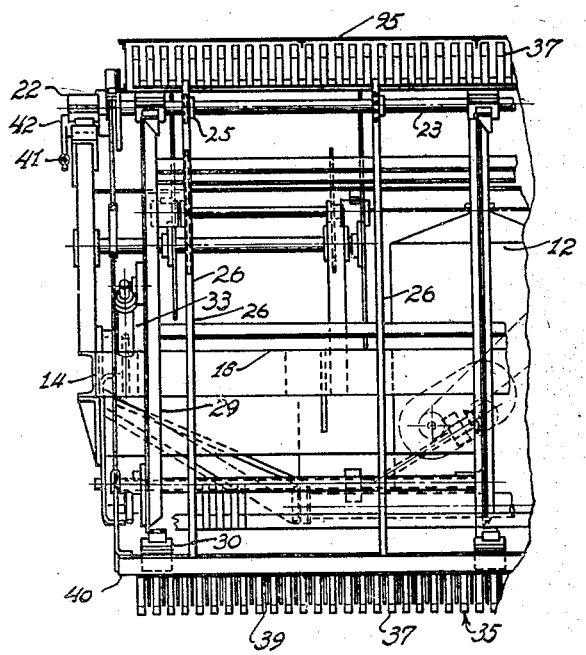
Fig. 5 is a front elevation of the forward part of the conveyor system, rearward of the driver's position.

The beach cleaning apparatus is superimposed upon a standard form of track-laying tractor or motor vehicle designated generally as 10, which in the embodiment chosen for illustration, comprises track-laying units 11, an engine hood 12, and a rearwardly disposed operator's portion, whereat the normal controls are placed, in the vicinity indicated by the numeral 13. Upon the tractor 10 we provide laterally spaced apart frames comprising a pair of lower, forwardly extending beams 14, these beams extending well forward of the tractor. Similar beams 15 are located longitudinally thereabove, but extend rearwardly of the tractor, the beams 14 and 15 being interbraced by members 16 and cross-braced by members 17 to provide a unitary skeleton framework. As shown in Figs. 1 and 3, a cross beam 18 joins the forward ends of the laterally spaced lower beams 14, and braces 19 extend forwardly from the beam 18 to carry caster wheels 20. These wheels are not steerable, since steering of the vehicle is accomplished by differential movement of the track-laying units 11, under the control of the operator. When the machine is turned by such differential track action, the front end of the machine, with the casters 20, may swing at will without imposing an undue turning drag. Centrally of the beam 18, an operator's seat 21 is placed and various controls, to be described later, are placed within his easy reach. Along the top beams 15 are spaced a plurality of shaft hangers 22, and between opposed hangers, shafts 23 are placed. Similar shaft hangers 24, with cooperating shafts, are anchored to the under side of the beams 15 for a purpose which will shortly become apparent. Each of the shafts 23 with the corresponding lower shafts, carries idler wheels 25 to support belts 26 comprising part of the conveyor system. A driven cross-shaft 27 joins the rearwardmost shaft hangers 22, over the rearward end of which the several belts 26 are adapted to pass, the upper run of the belts being moved rearwardly; whereby the lower run of the belts moves forwardly, the forward movement being supported by the occasionally spaced shafts with their idler pulleys borne by the shaft hangers 24. The idler wheels carried by the shaft hangers 24 are of large size, as indicated at 28. The forwardmost shaft 23, on the beam 15, provides a point at which the run of the conveyor belts drops forwardly and downwardly on a movable frame 29 pivoted on the same centers as the forwardmost shaft hangers 23, this frame 29 being provided at its lower end with bearings 30 having a cross shaft 31 and wheels 32, around which the belt may run. A hydraulic jack 33 is pivoted between the frame 29 and the forwardmost frame member 16, by which the frame 29 may be swung about its pivot so that its lower end is carried at varying distances from the ground surface over which the machine operates.

The belts 26 may be in the form of roller chains, and correspondingly, wheels 34 on the rear transverse shaft 27 are in the form of sprockets, by which these chains are all driven at unitary speed. Rakes 35 are carried at longitudinally spaced intervals along the several belts 26, the rakes comprising cross members 36 carrying a plurality of spaced tines 37, the form of these tines being best shown in the lower part of the belt, as in Fig. 1—the tines extend substantially normal from the belt run and then are bent forwardly whereby they may dig into the sand to entrain litter, to then carry it upwardly on the conveyor. As the conveyor belt moves upwardly as indicated by the arrow in Fig. 1, the sand may sift therefrom, so that as the litter reaches the top substantially horizontal belt run, most of the sand has sifted therefrom. On passing over the forwardmost shaft 23, the litter is carried rearwardly along the belt and a flat metal shield 38 is provided thereunder to prevent the dropping of litter upon the tractor.

The lower end of the frame 29 may be provided with a packing comb 39, this being carried by a frame 40 which is biased as to its action, by springs 41 acting through a lever linkage 42 and a rod 43 provided with a turnbuckle 44 for proper adjustment.

A cam 42', on the forward shaft 23, acts on the lever linkage 42 to raise and lower the packing comb 39 between the dotted and solid line positions of Fig. 1 as the machine progresses, which action serves to stuff matter into the conveyor and serves to prevent refuse being pushed ahead thereof.

Figure 2:
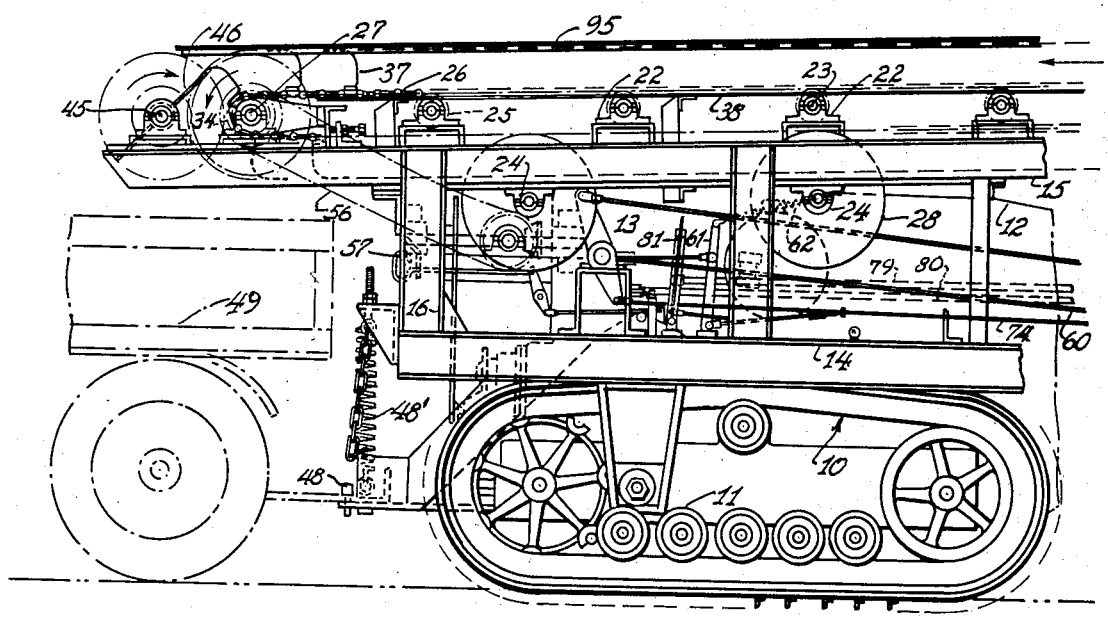
Fig. 2 is a side elevation of the rearward part of the machine showing diagrammatically the cart or wagon which is towed rearward thereof to receive discharged litter.

Mounted rearwardly of the shaft 27, on the beams 15, is an additional shaft 45 carrying stripper combs 46, the teeth of which are spaced to overlap the tines 37 on the conveyor belt, and to pass through the intertine spaces of said tines 37. This shaft 45 is driven from the shaft 27 by gearing 47, in opposite rotational sense, so that as the rakes pass around the shaft 27, the stripper combs 46 remove from the rakes litter which is carried thereby or impaled thereon. The teeth of the stripper combs 46 are provided with rubber tubes 46', slipped thereover, which tubes project beyond the ends of the respective teeth. The tubes act somewhat as flails to remove litter from the conveyor tines 37 and additionally, the high friction of the rubber pulls paper and other refuse off the conveyor, leaving the latter cleaner, and causing less tearing of scrap paper than when the stripper teeth are left bare. As shown in Fig. 2, this stripper organization overhangs the rearward end of the machine. A more or less conventional trailer hitch 48 mounted on the rear of the tractor, is adapted to have attached to it, a trailer wagon 49, the rearward end of which lies below the stripper 46, so that all matter dumped therefrom drops into the wagon. The machine is caused to bear principally on the ground in the region of the front part of the track-laying units 11, since a spring 48' tends to pull the rear part of the conveyor frame down toward the hitch 48, thereby relieving some of the weight from the idler wheels 20 and permitting easy turning of the whole machine about the forward end of the track-laying units as a fulcrum.

Figure 4:
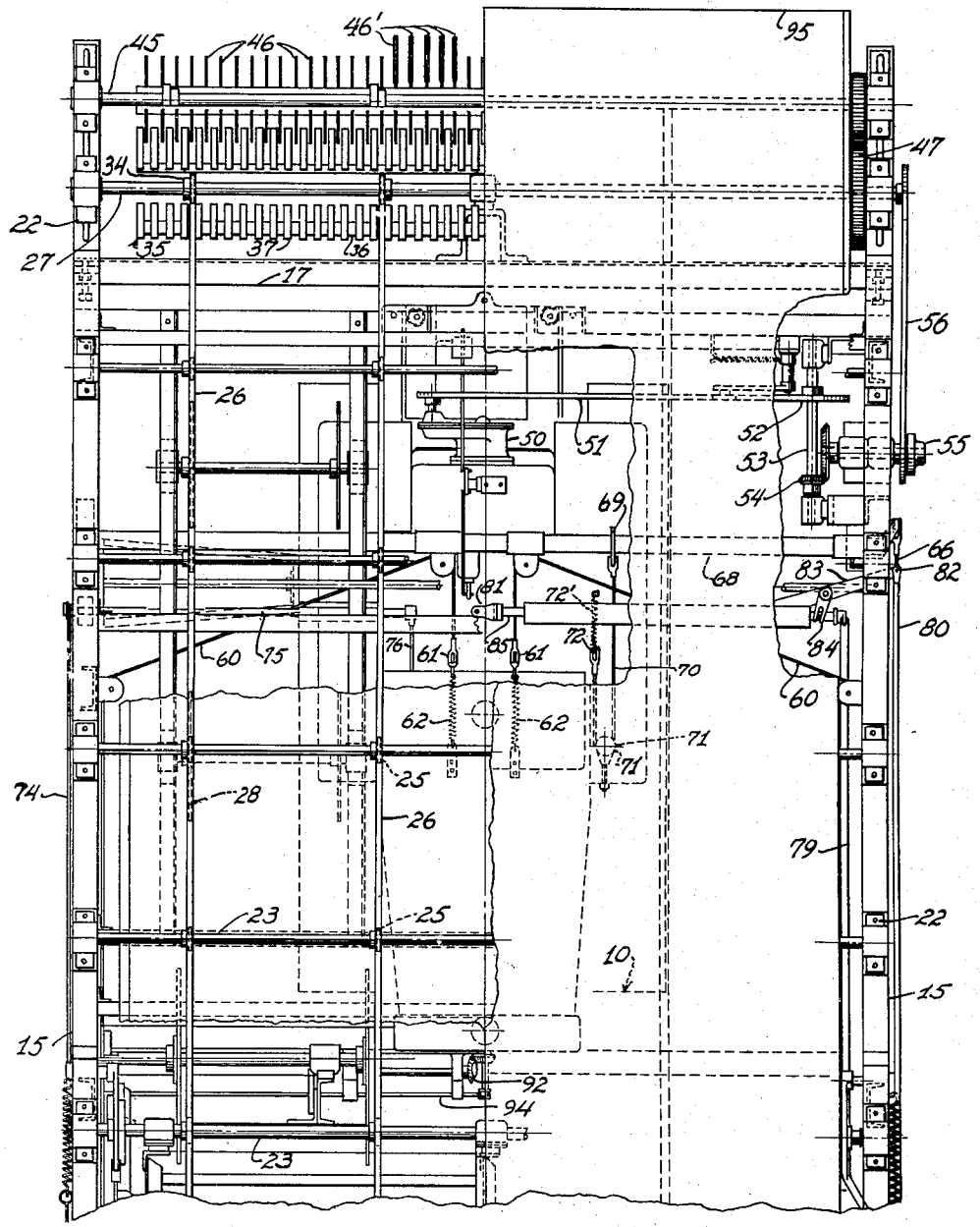
Fig. 4 is a plan, partly broken away, of the rearward part of the machine.

In order to drive the conveyor and stripper organization above described, we provide a gearing organization starting from the normal power takeoff 50 with which the tractor is provided. From the power takeoff, a roller chain 51 drives a sprocket 52 mounted on a shaft 53 carried by the frame 14—15—16. Coacting bevel gears 54 drive a transverse shaft 55 upon which is mounted a sprocket serving to drive a chain 56 which extends rearwardly, as shown in Figs. 2 and 4, to the drive shaft 27, by which the conveyor system is operated. As shown in Fig. 2, a handle 57 is arranged, through suitable linkage, to operate the normal power take-off clutch provided on the tractor, this handle 57 being located at the rear of the machine, since it is unnecessary to operate this as one of the normal controls.

In Figs. 1 and 3, we show the various control levers, adjacent the seat 21, by which the machine is operated. The two levers each designated as 58 serve to clutch and declutch the track units 11 of the tractor through cross shafts 59 operating on cables 60 guided over suitable sheaves to approach the standard steering levers 61 from the rear, as shown in Fig. 4. Return springs 62 serve to urge the steering levers 61 forwardly at all times, so that by pulling the cables 60, the levers 61 are moved selectively rearwardly to accomplish steering of the apparatus. A foot-operated clutch pedal 63, adjacent the seat 21, as shown in Figs. 1 and 3, is connected to a cross-shaft 64 having a lever end at 65 clevised to a pull rod 66 passing along the right hand side of the machine, as shown. At its rearward end, the pull rod 66 connects to a cross-shaft 68 having a lever 69 to which a cable 70 is attached, the latter passing around a sheave 71 to a standard tractor clutch lever 72. This clutch serves to disconnect the power plant of the tractor from any driving connection with either the track-laying units 11 or the conveyor system.

A spring 72' serves to assist in returning the lever 72 to its normal position when the cable 70 is relaxed.

Another essential control of the vehicle is the throttle lever 73 adjacent the operator's seat 21, this being connected to a suitable cross-shaft operated on a pull rod 74 operating through a rearwardly located cross-shaft 75 to actuate a standard throttle control 76.

The gear shifting is controlled by two levers 77 and 78 adjacent the seat 21, shown in Figs. 1 and 3, which coact through push-pull rods 79 and 80 extending rearwardly of the machine to control the gear shift lever 81, indicated centrally of Figs. 2 and 4. The shift lever 81 normally has an H movement to take care of reverse, and first, second and third forward speeds. With the remote control necessitated by the forward driver's position, and since all of the controls as indicated in the preceding description must necessarily be carried around the outside of the frame members to avoid interference with the conveyor belt, it becomes necessary to provide a dual arrangement by which the one gear shift lever 78 accomplishes lateral movement of the shift lever 81 in the slot of its H, while the other lever 77 effects, through the rod 79, forward and rearward movement of the shift lever 81 in the lateral legs of its H slot. The means by which this is accomplished is clear in Fig. 4, wherein the control rod 80 terminates at 82 in a bellcrank 83, having a slotted end 84 engaging a pin on the rod 85. Thus, it is apparent that when the rod 80 is moved forwardly and rearwardly, the rod 85 is moved laterally. When the other control rod 79 is moved forwardly and rearwardly, it effects forward and rearward movement of the rod 85 and thus of the shift lever 81.

The above described controls are those which are necessary to normal operation of the vehicle as a tractor. One additional control is required for the hydraulic jack 33 to raise and lower the conveyor from and to contact with the ground. This is accomplished by the lever 86, shown in Figs. 1 and 3, which lever acts directly upon a fluid pump 87 suitably connected to the jack. A button 88 on the pump 87 serves to relieve pressure from the fluid system by which the jack is caused to move in the opposite direction from that in which it is moved by applying pressure by operating the lever 86.

The ignition control for the tractor is carried to a lateral point ahead of one of the track units 11, as shown at 90 in Fig. 1. Cranking of the tractor engine is accomplished by a crank 91 carried to a point adjacent to the ignition switch, this crank acting through bevel gears 92, shown in Fig. 4. The normal dog clutch organization of the engine cranking system is actuated by a lever 93 adjacent the crank 91, acting through a rod 94 to press the said normal clutch into engagement.

The above described organization, although it might appear to be complicated, is actually relatively simple. The various control elements for the tractor are simply carried forward around the sides of the machine to a point adjacent the driver's position. The conveyor itself is operated by the tractor engine and serves to pick up litter before it has been pressed down by the track-laying units, carrying it upwardly and rearwardly over the machine to be discharged into the wagon 49. The forward position of the driver permits full vision and divorces him from the machine per se, so that he is not subject to the litter and sand which the machine handles. The only unusual control from that normally necessary for tractor operation is the hydraulic pump controlled by the lever 86, by which the conveyor is located with respect to the ground. To further shield the operator and to improve the appearance of the machine, a fairing 95 passes upwardly and rearwardly from the rear of the driver's seat over the conveyor belt, to a rearward point adjacent the stripper 46. This fairing also serves to prevent litter being carried by the conveyor from being dispersed by wind.

In actual tests of a machine built in accordance with the foregoing specification, successful results have been obtained, and it has been demonstrated that the machine is capable of effectively cleaning beach areas in much less time and with much less work than is possible by manual cleaning effort. Likewise, the machine has proved itself to do an effective job of cleaning, removing all objectionable litter in the form of bottles, papers and other trash. It was found necessary to do some experimental work with respect to the pitch of the rakes mounted on the conveyor belts, in order to pick up all the litter, while at the same time minimizing the amount of sand picked up by the machine—if the teeth of the rakes are too closely spaced, a considerable amount of sand is apt to be picked up, particularly where the sand is damp, and conversely, if the teeth are too widely spaced on the rakes, the rakes will not pick up smaller articles, paper and the like.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. A beach cleaning machine comprising, in combination, a vehicle having a prime mover, a conveyor belt, means supporting said conveyor belt to carry same from a point level with the ground, ahead of said vehicle, upwardly and rearwardly over said vehicle, means to drive said conveyor belt from said prime mover, an extension on said vehicle projecting ahead of said conveyor belt, an operator's seat on said extension ahead of said conveyor, and controls for said prime mover mounted adjacent said operator's seat.

2. A ground cleaning machine comprising, in combination, a vehicle having a prime mover, a pick-up device carried by and disposed ahead of said vehicle, at substantially ground level, for picking up loose objects over which the machine is adapted to travel, and a conveyor system extending rearwardly and over said vehicle, from said pick-up device, for discharging the objects at the rear of said machine.

3. A ground cleaning machine comprising, in combination, a vehicle having a prime mover, a pick-up device carried by and disposed ahead of said vehicle, at substantially ground level, for picking up loose objects over which the machine is adapted to travel, a conveyor system extending rearwardly and over said vehicle, from said pick-up device, for discharging the objects at the rear of said machine, an extension projecting ahead of said conveyor, and an operator's seat mounted on said extension ahead of said conveyor.

4. In a beach cleaning machine, in combination, a track-laying tractor, beams on either side of said tractor, a shaft extending between said beams substantially over the front end of said tractor, a swingable frame carried on said shaft and extending downwardly and forwardly ahead of said tractor, means for raising or lowering said frame, and a conveyor belt having rakes carried thereby, borne by said swingable frame and said beams to run upwardly from said swingable frame and over the top of said tractor.

5. In a beach cleaning machine, in combination, a track-laying tractor, beams on either side of said tractor, a shaft extending between said beams substantially over the front end of said tractor, a swingable frame carried on said shaft and extending downwardly and forwardly ahead of said tractor, means for raising or lowering said frame, a conveyor belt having rakes carried thereby, borne by said swingable frame and said beams to run upwardly from said swingable frame and over the top of said tractor, and stripper combs at the rearward portion of said tractor for stripping objects carried by said conveyor belt.

6. In a beach cleaning apparatus, in combination, a vehicle, a conveyor belt, means for supporting said conveyor belt on said vehicle including devices for holding a portion of said conveyor belt in close proximity to the ground ahead of said vehicle, and a cart towed by said vehicle into which objects carried by said conveyor belt are adapted to be discharged.

7. In a beach cleaning machine, in combination, a vehicle, a conveyor belt running forwardly and rearwardly over and in front of said vehicle, said conveyor belt being wider than the vehicle per se, extensions on the vehicle extending ahead of said conveyor belt, an operator's position located on said extensions, and control apparatus for said vehicle extending therefrom, around said conveyor belt, to said operator's position.

8. A beach cleaning machine comprising a frame, accommodations for an operator at the extreme forward end of said frame, a conveyor system comprising a belt having substantially parallel upper and lower runs, means for supporting said belt, certain of said means holding the belt in close proximity to the ground behind said operator's position and other of said means carrying said belt upwardly and rearwardly of the machine, and a prime mover for the machine in the rearward lower portion thereof, whereby a portion of said conveyor passes over the prime mover.

9. A beach cleaning machine comprising a frame, accommodations for an operator at the extreme forward end of said frame, a conveyor system comprising a belt having substantially parallel upper and lower runs, means for supporting said belt, certain of said means holding the belt in close proximity to the ground behind said operator's position and other of said means carrying said belt upwardly and rearwardly of the machine, a prime mover for the machine in the rearward lower portion thereof, whereby a portion of said conveyor passes over the prime mover, and a stripper mechanism at the rear of, and operating on, said conveyor.

10. In a beach cleaning machine, a driven conveyor comprising a plurality of longitudinally spaced transverse rakes having teeth, and a stripper for removing litter carried by said rakes comprising a comb having tines spaced to move in the interdental spaces of the conveyor rakes, means to move said stripper through said rakes at a linear speed greater than the linear speed of said conveyor, and a resilient high friction extension on each stripper tine for cushioning engagement with litter carried by the rakes to effect gradual removal of said litter by frictional engagement therewith.

11. A ground cleaning machine comprising, in combination, a vehicle having a prime mover, a pick-up device carried by and disposed ahead of said vehicle, at substantially ground level, for picking up loose objects over which the machine is adapted to travel, a conveyor system extending rearwardly and over said vehicle, from said pick-up device, for discharging the objects at the rear of said machine, and an enclosure for said conveyor system to prevent dispersion of objects carried thereby.

12. In a ground cleaning machine, in combination, a vehicle, an operator's position, having controls for the machine, at the extreme forward end thereof, a carrier extending from substantially ground level upwardly and rearwardly relative to the machine, a conveyor belt running over said carrier having means for picking up objects on the ground, a stripper at the upper rearward end of said carrier for stripping objects from the belt, and a cart towed directly behind the vehicle and below said stripper into which objects removed from the belt by said stripper are directly discharged.

13. In a ground cleaning machine, in combination, a vehicle, an operator's position, having controls for the machine, at the extreme forward end thereof, a carrier extending from substantially ground level upwardly and rearwardly relative to the machine, a conveyor belt running over said carrier having means for picking up objects on the ground, a stripper at the upper rearward end of said carrier for stripping objects from the belt, a cart towed directly behind the vehicle and below said stripper into which objects removed from the belt by said stripper are directly discharged, and an enclosure for said conveyor belt to prevent dispersion of objects carried thereby.

WILLIAM T. HOOFNAGLE.
GEORGE MALVESE.